United States Patent
Onda

[19]

[11] Patent Number: 6,163,412
[45] Date of Patent: Dec. 19, 2000

[54] ZOOM LENS BARREL ASSEMBLY FOR A CAMERA INCLUDING A ROTATING BARREL CAPABLE OF SELECTING ONE OF SEVERAL ZOOM POSITIONS AS WELL AS FOCUSING

[75] Inventor: Kazuhiko Onda, Saitama, Japan

[73] Assignee: Fuji Photo Optical Co., Ltd., Saitama, Japan

[21] Appl. No.: 09/238,425

[22] Filed: Jan. 28, 1999

[30] Foreign Application Priority Data

Jan. 29, 1998 [JP] Japan .................................. 10-016535

[51] Int. Cl.[7] .................................................. G02B 15/14
[52] U.S. Cl. .............................................................. 359/696
[58] Field of Search ..................................... 359/694, 696, 359/697, 698, 823

[56] References Cited

U.S. PATENT DOCUMENTS 5,793,537   8/1998   Nomura et al. ......................... 359/700
5,956,189   9/1999   Azegami et al. ....................... 359/823

FOREIGN PATENT DOCUMENTS

6-100707   12/1994   Japan .
9-43487    2/1997    Japan .

*Primary Examiner*—Ricky Mack
*Attorney, Agent, or Firm*—Young & Thompson

[57] ABSTRACT

A zoom lens barrel assembly for zooming and focusing of the zoom lens by shifting lenses of a zoom lens along the optical axis which includes a motor driven operating barrel operative to make zooming and focusing of said zoom lens, a first cam barrel with zooming and focusing cams capable of being situated in predetermined zooming positions arranged at regular angular intervals by a positioning mechanism to achieve zooming of the zoom lens, and a second cam barrel capable of rotating together with the motor driven operating barrel and relatively to the first cam barrel through an angular interval corresponding to an integral multiple as long as the regular angular interval to focus the zoom lens while the first barrel is situated in a predetermined zooming position to achieve focusing of the zoom lens. The first and second cam barrel are operationally coupled together so as to turn as one whole during zooming said zoom lens.

12 Claims, 10 Drawing Sheets

RETRACTED → z1
POSITIOOON

| CSD | ∞ | ROTATIONAL DIRECTION OF OUTER INTER-MEDIATE BARREL | ENCODING POSITION | ZOOM POSITION |
|---|---|---|---|---|
|  |  |  | ENC - 0 | RETRACTED |
|  |  |  | ↓ | ↓ |
|  |  | CCW | ENC - 3 | z1 CDP |
|  |  |  | ↓ | ↓ |
|  |  | CW | ENC - 1 | z1 ∞ |
|  |  |  | ↓ | ↓ |
|  |  | CCW | PULSE COUNT | FOCUSING |
|  |  |  | ↓ | ↓ |
|  |  | CW | ENC - 1 | z1 ∞ |

FIG. 6B z1 → z1

| CSD | ∞ | ROTATIONAL DIRECTION OF OUTER INTER-MEDIATE BARREL | ENCODING POSITION | ZOOM POSITION |
|---|---|---|---|---|
|  |  |  | ENC - 1 | z1 ∞ |
|  |  |  | ↓ | ↓ |
|  |  | CCW | ENC - 4 | z2 CDP |
|  |  |  | ↓ | ↓ |
|  |  | CW | ENC - 2 |  |
|  |  |  | ↓ | ↓ |
|  |  | CCW | PULSE COUNT | FOCUSING |
|  |  |  | ↓ | ↓ |
|  |  | CW | ENC - 2 | z2 ∞ |

FIG. 6C z4 → z3

| | CSD ∞ | ROTATIONAL DIRECTION OF OUTER INTERMEDIATE BARREL | ENCODING POSITION | ZOOM POSITION |
|---|---|---|---|---|
| | ⌐▮ | | ENC - 4 | z4 ∞ |
| | | | ↓ | ↓ |
| | ⌐▮→ | CW | ENC - 3 | z3 ∞ |
| | | | ↓ | ↓ |
| | ⌐▮← | CCW | PULSE COUNT | FOCUSING |
| | | | ↓ | ↓ |
| | ⌐→▮ | CW | ENC - 3 | z3 ∞ |

FIG. 7A

RETRACTED POSITIOOON → z1

| | CSD ∞ | ROTATIONAL DIRECTION OF OUTER INTERMEDIATE BARREL | ENCODING POSITION | ZOOM POSITION |
|---|---|---|---|---|
| | ⌐▮ | | ENC - 0 | RETRACTED |
| | | | ↓ | ↓ |
| ←⌐▮← | | CCW | ENC - 3 | z2 CDP |
| | | | ↓ | ↓ |
| | ⌐→▮ | CW | PULSE COUNT | FOCUSING |
| | | | ↓ | ↓ |
| | ⌐▮← | CCW | ENC - 3 | z1 CDP |

FIG. 7B z1 → z2

| | ROTATIONAL DIRECTION OF OUTER INTERMEDIATE BARREL | ENCODING POSITION | ZOOM POSITION |
|---|---|---|---|
| CSD  ∞ | | | |
| | | ENC - 3 | z1  CDP |
| | | ↓ | ↓ |
| | CCW | ENC - 4 | z2  CDP |
| | | ↓ | ↓ |
| | CW | PULSE COUNT | FOCUSING |
| | | ↓ | ↓ |
| | CCW | ENC - 4 | z2  CDP |

FIG. 7C z4 → z3

| | ROTATIONAL DIRECTION OF OUTER INTERMEDIATE BARREL | ENCODING POSITION | ZOOM POSITION |
|---|---|---|---|
| CSD  ∞ | | | |
| | | ENC - 6 | z4  CDP |
| | | ↓ | ↓ |
| | CW | ENC - 4 | z4  ∞ |
| | | ↓ | ↓ |
| | CW | ENC - 3 | z3  ∞ |
| | | ↓ | ↓ |
| | CCW | ENC - 5 | z3  CDP |
| | | ↓ | ↓ |
| | CW | PULSE COUNT | FOCUSING |
| | | ↓ | ↓ |
| | CCW | ENC - 5 | z3  CDP |

FIG. 8A

RETRACTED POSITION → z1 → z2

| | ROTATIONAL DIRECTION OF OUTER INTERMEDIATE BARREL | ENCODING POSITION | ZOOM POSITION |
|---|---|---|---|
| CSD ∞ | | ENC - 0 ↓ | RETRACTED ↓ |
| ← | CCW | ENC - 3 ↓ | z1  CDP ↓ |
| → | CW | PULSE COUNT ↓ | FOCUSING ↓ |
| ← | CCW | ENC - 3 ↓ | z1  CDP ↓ |
| ← | CCW | ENC - 4 ↓ | z2  CDP ↓ |
| → | CW | PULSE COUNT ↓ | FOCUSING ↓ |
| ← | CCW | ENC - 4 ↓ | z2  CDP ↓ |

FIG. 8B z4 → z3 → RETRACTED POSITION

| CSD | ∞ | ROTATIONAL DIRECTION OF OUTER INTER-MEDIATE BARREL | ENCODING POSITION | ZOOM POSITION |
|---|---|---|---|---|
| | | | ↓ | ↓ |
| | | CCW | ENC - 6 | z4  CDP |
| | | | ↓ | ↓ |
| | | CW | ENC - 3 | z3  ∞ |
| | | | ↓ | ↓ |
| | | CCW | PULSE COUNT | FOCUSING |
| | | | ↓ | ↓ |
| | | CW | ENC - 3 | z3  ∞ |
| | | | ↓ | ↓ |
| | | CW | ENC - 0 | RETRACTED |
| | | | ↓ | ↓ |

ZOOM LENS BARREL ASSEMBLY FOR A CAMERA INCLUDING A ROTATING BARREL CAPABLE OF SELECTING ONE OF SEVERAL ZOOM POSITIONS AS WELL AS FOCUSING

BACKGROUND OF THE INVENTION

1. Field of the Invention

This invention relates to a zoom lens barrel assembly for a camera, and, more particularly, to a power driven zoom lens barrel assembly for a camera which is operated by a single power drive device to achieve both adjusting a zoom ratio of the zoom lens and focusing the zoom lens.

2. Description of Related Art

In most zoom lenses, lens groups of the zoom lens are moved along optical axis by means of a cam mechanism differently between focusing the zoom lens on a subject and adjusting a zoom ratio of the zoom lens. To enable the zoom lens to achieve focusing and zooming in different manners, there have been proposed several techniques. Specifically, one of the techniques employs separate power drive devices such as electric motors for focusing and zoom ratio adjusting, respectively. Another technique employs a single power drive device. In the case where a single power drive device is used for both focusing and zoom ratio adjusting, there have been known several ways. One of them divides driving power from the single power drive device into two parts for focusing and zoom ratio adjusting. The second is, which is known from, for example, Japanese Patent Publication No. 6-100707, to incorporate a mechanism common to focusing and zoom ratio adjusting and to achieve focusing and zoom ratio adjusting alternately. Another one, which is known from, for example, Japanese Unexamined Patent Publication No. 9-43487, incorporates a restraint mechanism which causes relative axial movement along the optical axis between two lens groups of the zoom lens to achieve zoom ratio adjusting and locking axial movement of one of the two lens groups relative to the other during focusing.

The utilization of two power drive devices always yields an increase in camera price. The single power drive device cooperating with separate drive mechanisms for focusing and zoom ratio adjusting always needs an increased number of parts with an adverse effect of not only increasing costs but also increasing an overall size of the camera. The combination of a single power drive device and a common drive mechanism has a necessity for providing alternate lens guide cam slots for focusing and zoom ratio adjusting which makes a lens drive mechanism quite complex. While the last zoom lens drive system can remove the above drawbacks, however, the locking mechanism needs an electromagnetic solenoid to disconnect operative linkage between one of the two lens groups and its associated cam to lock the axial movement of the lens group and to hold the lens group with friction only so as to remain immovable, which possibly leads to unstable focusing operation.

SUMMARY OF THE INVENTION

It is therefore an object of the invention to provide a zoom lens barrel assembly which is small in overall size and provided at low costs.

The object of the invention is accomplished by providing a zoom lens barrel assembly for a zoom lens of the type having a plurality of lenses shiftable along an optical axis to achieve both focusing and zooming.

According to a preferred embodiment of the invention, the zoom lens barrel assembly comprises a motor driven operating barrel rotatable in opposite directions to cause zooming and focusing of the zoom lens, respectively, a first barrel capable of rotating to shift at least one of the lenses along the optical axis for zooming the zoom lens, positioning means for situating and stopping the first barrel in a plurality of predetermined zooming positions arranged at regular angular intervals, and a second barrel, capable of rotating together with the motor driven operating barrel, which is operationally coupled to the first barrel together to rotate as one whole during zooming and is shiftable in opposite directions relatively to the first barrel through an angular interval to shift at least another one of the lenses relatively to the said one lens along the optical axis for focusing the zoom lens while the positioning means stops the first barrel in any one of predetermined zooming positions arranged at regular angular intervals.

According to another preferred embodiment of the invention, the zoom lens barrel assembly comprises a motor driven operating barrel rotatable in opposite directions to causing zooming and focusing of said zoom lens, respectively, a first barrel capable of rotating to shift at least one of the lenses along the optical axis for zooming the zoom lens, positioning means for situating and stopping the first barrel in a plurality of predetermined zooming positions arranged at regular angular intervals, and a second barrel, capable of rotating together with the motor driven operating barrel, which is operationally coupled to the first barrel together to rotate as one whole during zooming the zoom lens and shiftable relatively to the first barrel through an angular interval corresponding to an integral multiple as long as the regular angular interval of the zooming positions to shift at least another one of the lenses relatively to the said one of the lenses along the axis for focusing the zoom lens while the positioning means stops the first barrel in any one of said predetermined zooming positions.

In the specific embodiments, the first barrel has a zooming cam and a focusing cam, and the positioning means incorporates an encoder having encoding positions corresponding to the predetermined zooming positions, respectively and a click stop mechanism comprising a click ball and detent recesses arranged along the zooming cam at regular angular intervals on the first barrel.

The zoom lens barrel assembly of the invention achieves zooming of the zoom lens through an integral rotation of the first and second barrels following a rotation of the motor driven operating barrel in one direction and achieves focusing of the zoom lens through a relative shift between the first and second barrels following a rotation of the motor driven operating barrel in another direction, which realizes a simple structure of the zoom lens barrel assembly.

The zoom lens barrel assembly of the invention incorporating the positioning means which comprises an encoder and a click stop mechanism for situating and stopping the first barrel formed with a zooming cam provides accurate and secured zooming positions, which eliminates the necessity for an electrically operated clutch mechanism and its actuator operative to retain and release the first barrel in zooming positions and, accordingly, saves power of a battery. Further, the zoom lens barrel assembly of the invention incorporating the positioning means which incorporates an encoder having encoding positions arranged at regular intervals corresponding to regular angular intervals at which the predetermined zooming positions are arranged on the first barrel and the first and second barrels shiftable relatively to each other in the extent covering an angular interval corresponding to the regular angular interval between each adjacent zooming positions makes it accurate to focus the zoom lens at the respective zooming position, which is desirable for easy control of the rotation of the motor driven operating barrel. While the zooming positions are not always at regular angular intervals and may be laid out according to zooming cam designs, the layout of zooming positions at regular intervals allows the extent of shift between the first and second barrels to be made as long as integral multiples of the regular angular interval between each adjacent zooming positions, which is always desirable for the designing, manufacturing and operating the zoom lens barrel assembly.

BRIEF DESCRIPTION OF THE DRAWINGS

The above and other objects and features of the present invention will become clear from the following description of a specific embodiment thereof when considering in conjunction with the accompanying drawings wherein like numbers have been employed in the different figures to denote the structurally and operationally same parts and mechanisms, and in which.

DETAILED DESCRIPTION OF THE SPECIFIC EMBODIMENT

Because zoom lens barrel assemblies are well known, the present description will be directed in particular to elements and mechanisms forming part of, or cooperating directly with, a zoom lens barrel assembly in accordance with the present invention. It is to be understood that elements not specifically shown or described can take various forms well known to those skilled in the art.

The term "wide-angle direction" as used herein shall mean and refer to a clockwise (CW) direction as seen from the camera side in which the focal length of the zoom lens is shortened, and the term "telephoto direction" as used herein shall mean and refer to a counterclockwise (CCW) direction as seen from the camera side in which the focal length of the zoom lens is increased.

Figure 1:
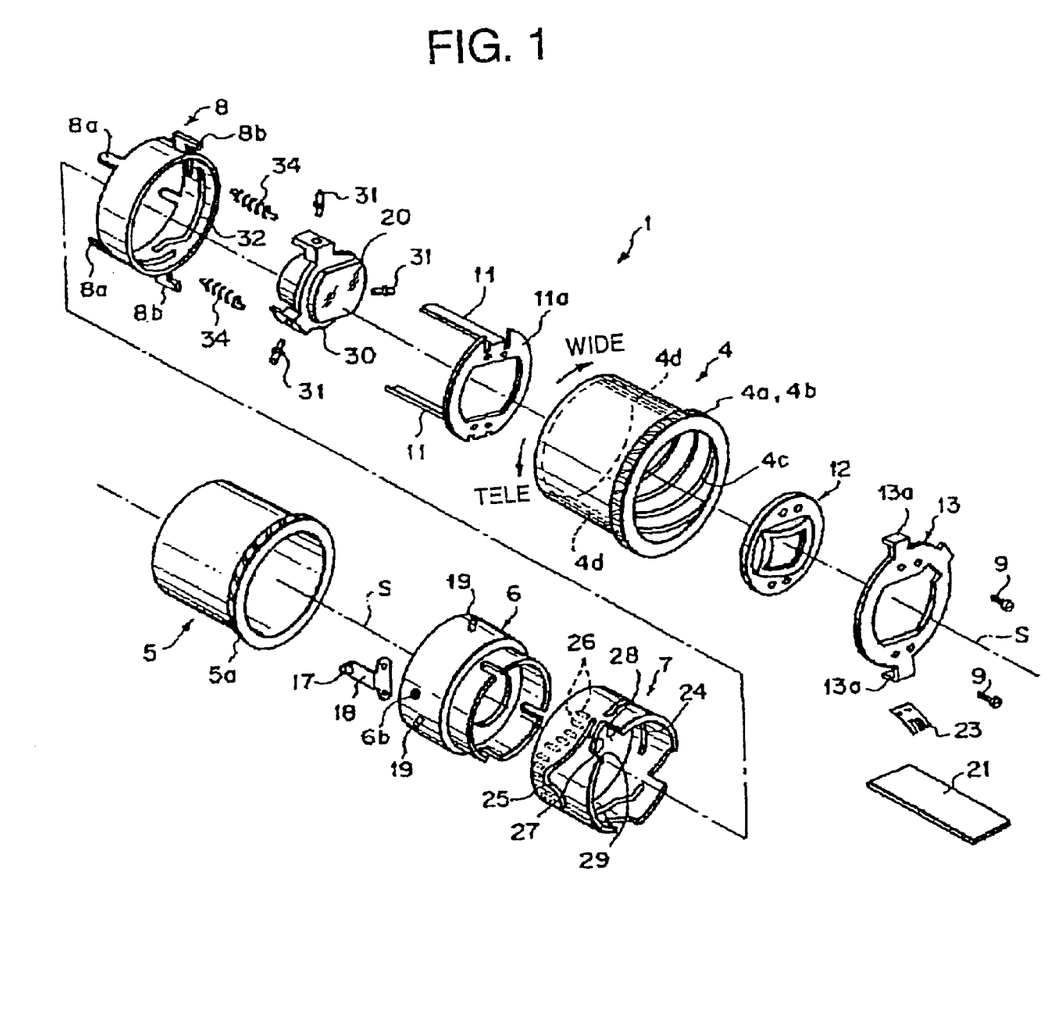
FIG. 1 is an exploded perspective cross-sectional view of an essential part of a zoom lens barrel assembly in accordance with an embodiment of the invention.
Figure 2:
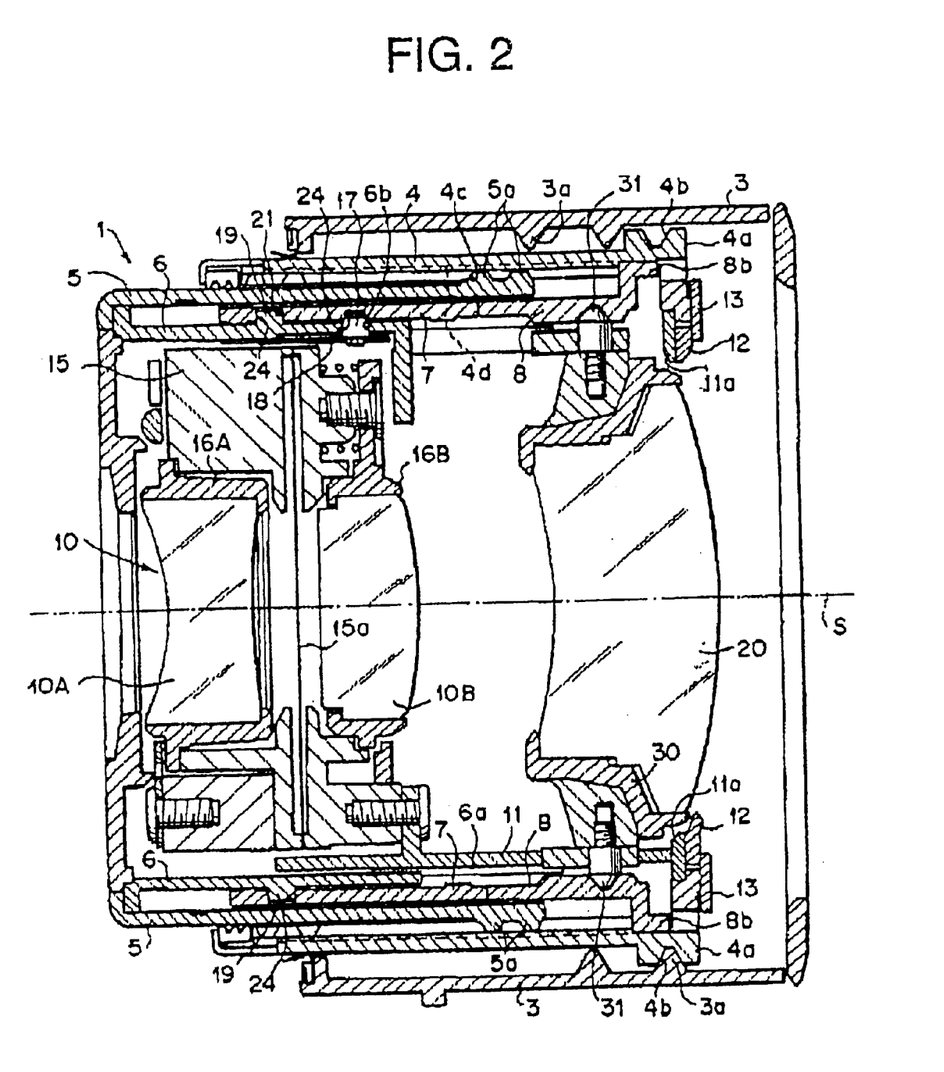
FIG. 2 is a longitudinal sectional view of the zoom lens barrel assembly shown in FIG. 1 which is placed in a wide-angle position.
Figure 3:
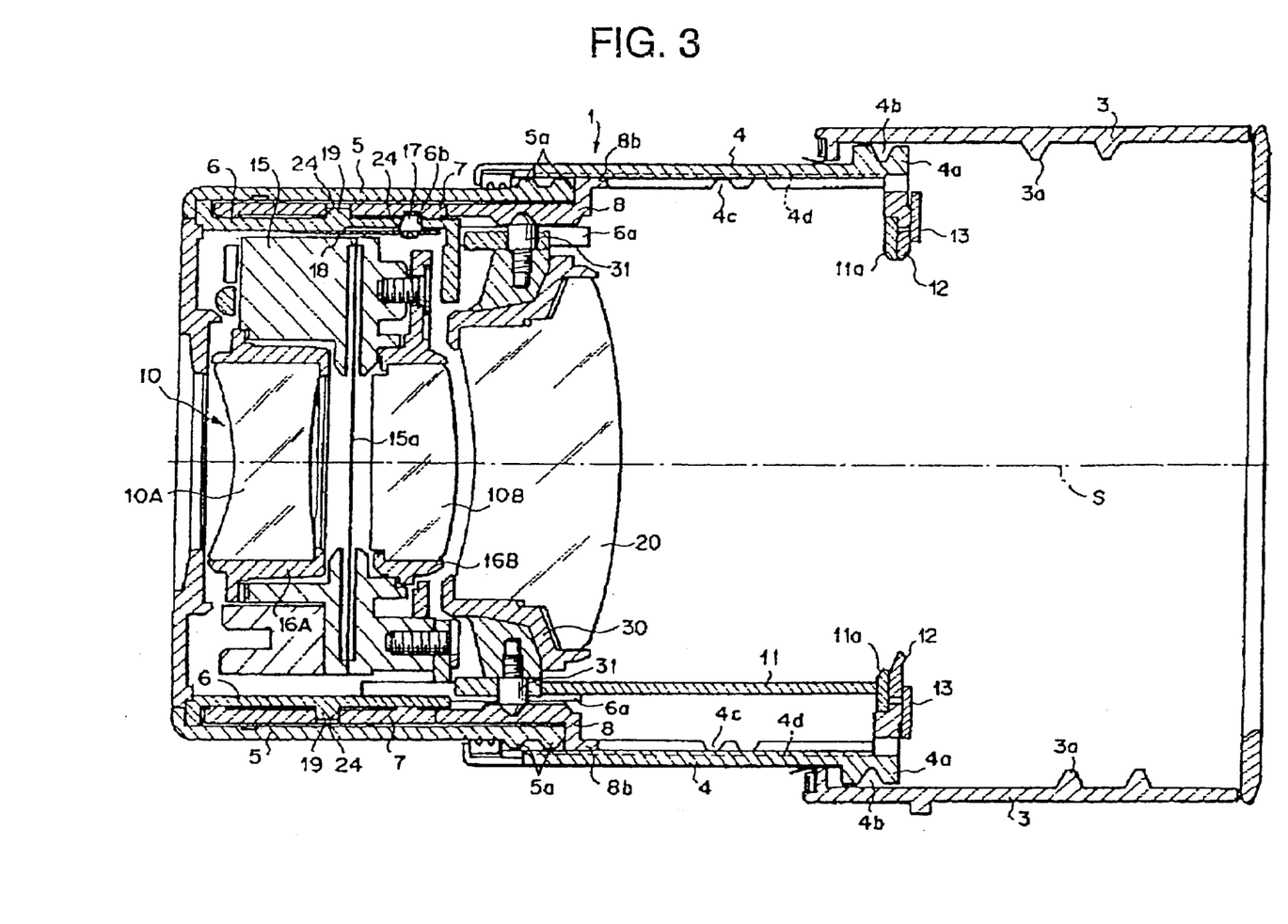
FIG. 3 is a longitudinal sectional view of the zoom lens barrel assembly shown in FIG. 1 which is placed in a telephoto position.

Referring to the drawings in detail, in particular, to FIGS. 1 through 3 schematically showing a zoom lens barrel assembly 1 in accordance with an embodiment of the invention, the zoom lens barrel assembly 1, which holds a zoom lens consisting of, for example, first to third lens groups 10A, 10B and 20, comprises cylindrical barrels coaxially arranged along an optical axis S of a zoom lens, namely a stationary barrel 3 which is fixed to a camera body (not shown), an outer intermediate barrel or operating barrel 4 disposed to turn in the stationary barrel 3, an inner intermediate barrel 5 disposed in the outer intermediate barrel 4 to move straightly back and force along the optical axis S following a turn of the outer intermediate barrel 4 in opposite directions, and an inner stationary barrel 6 fixedly disposed in the inner intermediate barrel 5. All these barrels 3–6 are coaxial with one another. Further, the zoom lens barrel assembly 1 incorporates a zooming/focusing cam barrel or first cam barrel (which is hereafter referred to as a ZF cam barrel for simplicity) 7 and a focusing barrel or second cam barrel 8 which are disposed coaxially with each other and axially side by side between the inner intermediate barrel 5 and the inner stationary barrel 6.

The outer intermediate barrel 4 at its rear end is formed with external gear teeth 4a on the outer wall thereof which are in mesh with elongated teeth of a on rod gear (not shown)installed to the stationary barrel 3 and external female helical threads 4b on the outer wall thereof which are in mesh with male helical threads 3a formed on the inner wall of the stationary barrel 3. Further, the outer intermediate barrel 4 is formed with female helical threads 4c and axial key grooves 4d in diametrically opposition positions on inner wall thereof. When the outer intermediate barrel 4 is turned in opposite directions by an reversible motor (not shown) disposed in the camera body through the rod gear, it is forced to thrust back and forth along the optical axis of the zoom lens. A turn in the CCW direction of the outer intermediate barrel 4 is followed by a forward axial movement of the inner intermediate barrel 5 and the inner stationary barrel 6 coupled together. A turn in the CW direction of the outer intermediate barrel 4 is followed by a reverse axial movement of the inner intermediate barrel 5 and the inner stationary barrel 6 coupled together.

An inner key ring 11a with integral keys 11 arranged in diametrically opposite positions and axially extending forward therefrom, an intermediate shield ring 12 and an outer key ring 13 with integral detents 13a arranged in diametrically opposite positions and axially extending forward therefrom are coupled together as a key ring assembly by means of set screws 9. The key ring assembly is installed to the rear end of the outer intermediate barrel 4 such that the inner key ring 11a and the outer key ring 13 put a rear flange 4e of the outer intermediate barrel 4 therebetween and the intermediate shield ring 12 meets the flange 4e in the radial direction. The key ring assembly and the outer intermediate barrel 4 are rotatable relatively to each other. The key assembly is coupled to the stationary barrel 3 by the detents 13a axially extending forward from the outer key ring 13 and received in axial grooves (not shown) formed in the inner wall of the stationary barrel 3 so as to slide in the axial grooves. By means of the engagement between the detents 13a and the grooves, the ring assembly is rotatable relatively to the outer intermediate barrel 4 but movable integrally with the outer intermediate barrel 4 in the axial direction.

As shown in FIGS. 2 and 3, the inner intermediate barrel 5 at its rear end is formed with external male helicoid threads 5a in mesh with the female helical threads 4c of the outer intermediate barrel 4, and the inner stationary barrel 6 at its rear end is formed with axial key grooves 6a arranged in diametrically opposite positions. The inner intermediate barrel 5 is coupled indirectly to the outer intermediate barrel 4 by means of keys 11 of the inner key ring 11a received in the key grooves 6a. The inner intermediate barrel 5, and hence the inner stationary barrel 6 fixedly installed in the inner intermediate barrel 5, is movable in the axial direction relatively to the outer intermediate barrel 4 but turns integrally with the outer intermediate barrel 4. The inner stationary barrel 6 fixedly mounts a front lens group 10 and a shutter unit 15 (only schematically shown) therein. The front lens group 10 includes a front lens 10A supported by a lens holder 16A and a rear lens 10B supported by a lens holder 16B arranged in order from the subject side. A shutter blade 15a, which is actuated by the shutter unit 15, is disposed between the front and rear lens holders 16A and 16B. The inner stationary barrel 6 at its front end is provided with a click-stop mechanism comprising an elastic click sleeve 18 fitted therein and a click ball 17 seated on the elastic click sleeve 18. As will be described later, the click ball 17 is situated in a bore 6b and partly extends out of the bore 6b to be forced against one of rectangular detent recesses 26 (see FIG. 4) formed in the ZF cam barrel 7 so as to roll in the bore 6b between the elastic click sleeve 18 and the ZF cam barrel 7. Further, the inner stationary barrel 6 is provided with three radial zooming cam followers 19 arranged at regular angular intervals on the outer wall thereof.

The zoom lens barrel assembly 1 is provided with an encoder operative to detect axial positions of the outer intermediate barrel 4 so as thereby to determine the zoom ratio of the zoom lens. As shown in FIG. 1, the encoder includes an encoder base plate 21 secured to the stationary barrel 3 formed with an electrically conductive encoder pattern 22 (see FIG. 4) and an encoder brush 23 secured to the outer key ring 13. When the outer intermediate barrel 4 moves back and forth, the encoder brush 23 slides on the encoder base plate 21 keeping in contact with the encoder pattern 22. When the encoder detects an axial position of the outer intermediate barrel 4 corresponding to an intended zoom ratio, the encoder provides a signal for stopping the motor.

Figure 4:
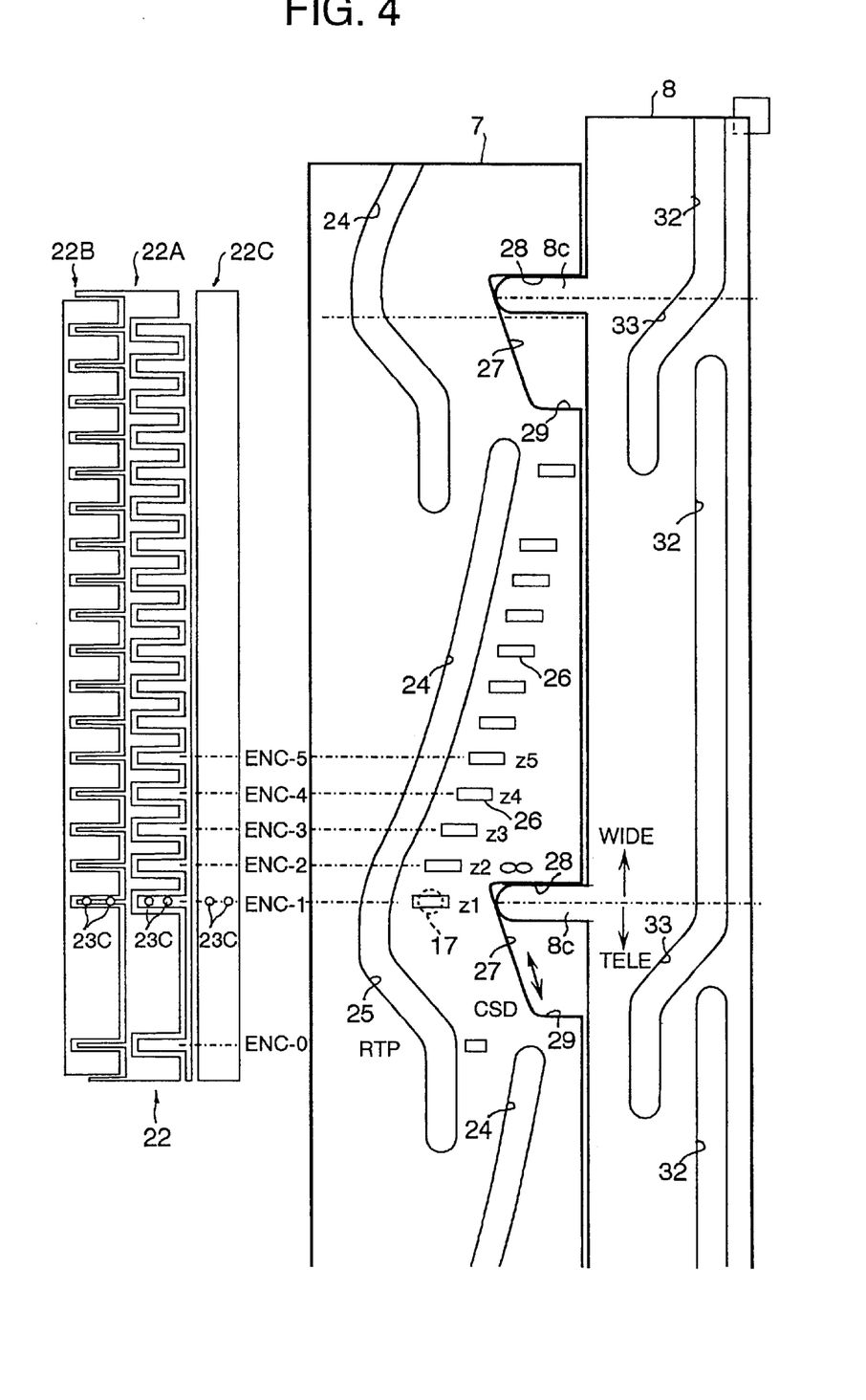
FIG. 4 is a partly developed view of a zooming/focusing cam barrel and a focusing barrel shown correspondingly to encoder pattern.

Referring to FIG. 4, which shows the positional relationship between the encoder pattern 22 on the encoder base plate 21 and cam slots of the ZF cam barrel 7 and the focusing barrel 8, the ZF cam barrel 7 has three cam slots engaged by the radial zooming cam followers 19 radially extending from the inner stationary barrel 6. Each zooming cam slot comprises a zooming cam slot section 24 and a lens barrel retracting cam slot section 25 continuously extending from the wide-angle end of the zooming cam slot section 24. The ZF cam barrel 7 is thrusted back and forth along the optical axis S through the engagement between the zooming cam slot sections 24 and the radial zooming cam followers 19 while the inner stationary barrel 6 turns in the opposite directions. As was previously described, the ZF cam barrel 7 is formed with a plurality of rectangular tapered detent recesses 26 arranged at predetermined zooming positions (z1, z2, z3, . . . ) with regular angular intervals along the entire zooming cam slot section 24. The click ball 17 is forced against the inner wall of the ZF cam barrel 7 by the elastic click sleeve 18 and, when enters one of the detent recesses 26 of the ZF cam barrel 7, brakes the ZF cam barrel 7 in the angular position. The ZF cam barrel 7 shown in FIG. 4 is in the wide-angle end position where the click ball 17 is in engagement with the detent recess 26 in a predetermined zooming position z1 corresponding to one end of the zooming cam slot section 24. The ZF cam barrel 7 further has three straight focusing cam surfaces 27 formed separately at regular angular intervals at its rear end. Each focusing cam surface 27 is always engaged by a focusing axial cam followers 8a extending axially forward from the focusing barrel 8. The focusing cam surface 27 is inclined with respect to a plane perpendicular to the optical axis S and extends between axially extending side surfaces 28 and 29 so that the distance of the focusing cam surface 27 from the focusing barrel 8 linearly increases as the ZF cam barrel 7 turns in the wide-angle direction. The axial cam follower 8a is brought into engagement with the side surface 29 at which the zoom lens is focused on an infinite subject distance (∞) or with the side surface 29 at which the zoom lens is focused on a predetermined closest subject distance (CSD). The focusing barrel 8 is formed with three cam slots comprising a lens shifting cam slot section 32 and a lens barrel retracting cam slot section 33 continuously extending from the wide-angle end of the lens shifting cam section 32. There is provided a play interval between the infinite distance side surface 28 and the closest distance side surface 29 within which the ZF and focusing barrels 7 and 8 are allowed to make a relative shift. The play interval is equal to the regular angular interval between each adjacent detent recesses 26 of the ZF cam barrel 7, or to an integral multiple of the regular angular interval between each adjacent detent recesses 26, desirably two or three times as long as the regular angular interval (two times in this embodiment). The lens shifting cam slot section 32 is in a plane perpendicular to the optical axis S, and the lens barrel retracting cam slot section 33 is at a specified angle with respect to the lens shifting cam slot section 32.

The second lens group 20 is supported by a lens holder 30. The lens holder 30 is provided with three cam followers 31 extending radially and arranged at regular angular separations on the outer wall thereof and mounted in the inner stationary barrel 6 so as to be movable relatively to the inner stationary barrel 6 in the axial direction only. The three cam followers 31 of the lens holder 30 are received in the three cam slots of the focusing barrel 8, respectively. Since the lens holder 30 is prevented from turning relatively to the inner stationary barrel 6, it does not change its axial position relative to the focusing barrel 8 while the focusing barrel 8 turns between the wide-angle end position and the telephoto end position. Two tension springs 34 couples the lens holder 30 and the inner stationary barrel 6 together to force the cam followers 31 of the lens holder 30 against the front side surfaces of the lens shifting cam slot sections 32 of the focusing barrel 8 and the focusing axial cam followers 8a of the focusing barrel 8 against the focusing cam surface sections 27 of the ZF cam barrel 7. As seen in FIG. 2, the focusing barrel 8 at its rear end is integrally formed with two keys 8b extending rearward and arranged in diametrically opposite positions. Each key 8b is received in the axial key groove 4d of the outer intermediate barrel 4, so that the focusing barrel 8 and the outer intermediate barrel 4 turns together as one whole. When the ZF cam barrel 7 is dragged by the focusing barrel 8, the click ball 17 gets out of an detent recess 26 against the radial detent force exerted by the elastic click sleeve 18, then the ZF cam barrel 7 is allowed to turn together with the focusing barrel 8.

Figure 5A:
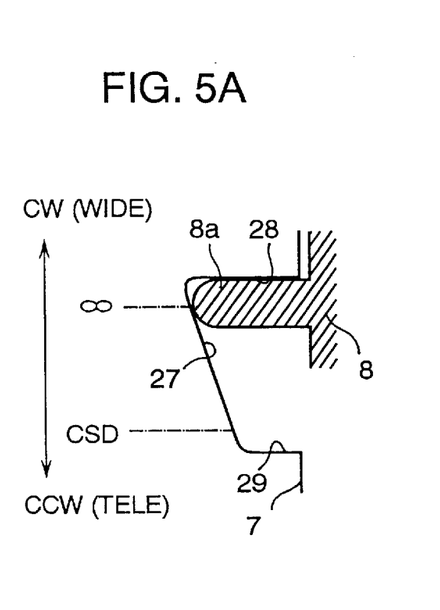
FIGS. 5A and 5B are explanatory views showing the relationship between a focusing and a zooming cam of the zooming/focusing cam barrel and a cam follower of the focusing barrel.
Figure 5B:
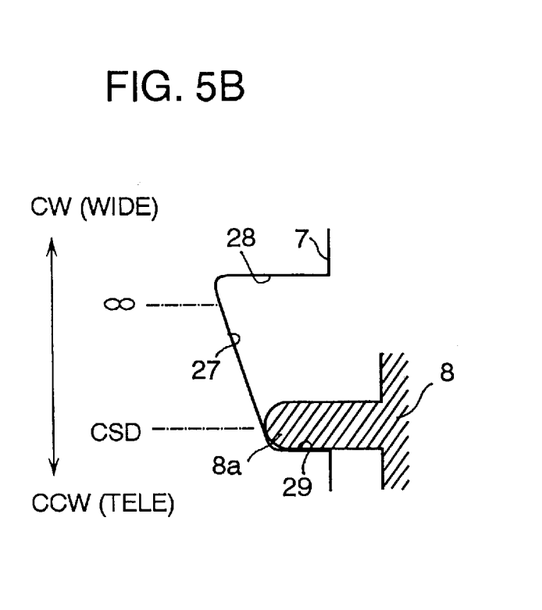

When the focusing barrel 8 is turned together with the outer intermediate barrel 4 in the wide-angle direction, it brings the cam follower 8a into engagement with the infinite distance side surface 28 of the focusing cam surface of the ZF cam barrel 7 as shown in FIG. 5A, dragging the ZF cam barrel 7 together therewith against the detent force exerted by the click ball 17 in the wide-angle direction. On the other hand, when the focusing barrel 8 is turned together with the outer intermediate barrel 4 in the wide direction, it brings the cam follower 8a into engagement with the closest distance side surface 29 of the focusing cam surface of the ZF cam barrel 7 as shown in FIG. 5B, dragging the ZF cam barrel 7 together therewith against the detent force exerted by the click ball 17 in the wide direction. While the inner stationary barrel 6 axially moves and the ZF cam barrel 7 and the focusing barrel 8 turn as one whole following a turn of the outer intermediate barrel 4, the ZF cam barrel 7 is shifted in axial position relative to the inner stationary barrel 6 through the engagement between the zooming cam slot sections 24 of the ZF cam barrel 7 and the radial zooming cam followers 19 of the inner stationary barrel 6, which is followed by an axial movement of both focusing barrel 8 and lens holder 30. In consequence, the rear lens group 20 held by the lens holder 30 changes the axial distance from the front lens group 10 to change a zoom ratio of the zoom lens as it moves in the axial direction.

The encoder pattern 22 is designed and adapted to provide a signal for stopping the motor so as thereby to stop the turn of the outer intermediate barrel 4 whenever it detect an intended zooming position, in other words, when the click ball 17 enters one of the detent recess 26 corresponding to the intended zooming position. Specifically, as shown in FIG. 4, the encoder pattern 22 comprises a center segment 22A and side segments 22B and 22C arranged in parallel with and on opposite sides of the center segment 22A. The center and side segments 22A and 22B are used for zooming and focusing, respectively. The side segment 22C is used as an earth segment commonly for zooming and focusing. Each of the center and side segments 22A and 22B has encoding teeth corresponding to the detent recesses 26. The encoder brush 23 has contact points 23a slidable on the center and side segments 22A, 22B and 22C. The encoding positions of the encoding teeth of the center and side segments 22A and 22B are indicated by reference signs ENC-1, ENC-2, ENC-3, ENC-4, . . . , correspondingly to zooming positions z1, z2, z1, z2, . . . , respectively, as shown in FIG. 4. Each of the center and side segments 22A and 22B further has an encoding tooth in an encoding position ENC-0 corresponding to a circumferential position of the lens barrel retracting cam slot section 25 of the ZF cam barrel 7.

In operation of the zoom lens barrel assembly 1, when the outer intermediate barrel 4 is turned in the CW or wide-angle direction until the infinite distance side surfaces 28 of the focusing cam surfaces of the ZF cam barrel 7 are engaged by the cam follower 8a of the focusing barrel 8 (FIG. 5A), the ZF cam barrel 7 is dragged by the focusing barrel 8 in the wide-angle direction. At the moment when the encoder detects an intended zooming position and provides a signal to stop the motor, the outer intermediate barrel 4 is stopped simultaneously with an inroad of the click ball 17 into a detent recess 26 corresponding to the intended zooming position, situating the ZF cam barrel 7 in the intended zooming position. When subsequently turning the outer intermediate barrel 4 back in the CCW direction, the focusing barrel 8 is turned back to shift the focusing axial cam followers 8a along the focusing cam surface 27 from the infinite distance side surfaces 28 toward the closest distance side surfaces 29. While the outer intermediate barrel 4 is turned through a predetermined angle in the CCW direction, the focusing barrel 8, and hence the lens holder 30 of the rear lens group 20, is forced rearward along the optical axis S differently from zooming to change the focus of the zoom lens from the infinite subject distance (∞) to the closest subject distance (CSD). After the focusing axial cam followers 8a have been brought into contact with the closest distance side surfaces 29, when further turning the outer intermediate barrel 4 in the CCW direction, the ZF cam barrel 7 is dragged in the telephoto direction to force the click ball 17 to get out of the detent recess 26, allowing the zoom lens to change the zoom ratio toward the smallest setting.

On the other hand, when the outer intermediate barrel 4 is turned in the CCW or telephoto direction until the closest distance side surfaces 29 of the focusing cam surfaces of the ZF cam barrel 7 are engaged by the cam follower 8a of the focusing barrel 8 (FIG. 5B), the ZF cam barrel 7 is dragged by the focusing barrel 8 in the CCW or telephoto direction. At the moment when the encoder detects an intended zooming position and provides a signal to stop the motor, the outer intermediate barrel 4 is stopped simultaneously with an inroad of the click ball 17 into a detent recess 26 corresponding to the intended zooming position, situating the ZF cam barrel 7 in the intended zooming position. When subsequently turning the outer intermediate barrel 4 back in the CW direction, the focusing barrel 8 is turned back to shift the focusing axial cam followers 8a along the focusing cam surfaces 27 from the closest distance side surface 29 toward the infinite distance side surface 28. While the outer intermediate barrel 4 is turned through a predetermined angle in the CW direction, the focusing barrel 8, and hence the lens holder 30 of the rear lens group 20, is forced forward along the optical axis S differently from zooming to change the focus of the zoom lens from the closest subject distance (CSD) position to the infinite subject distance (∞) position. After the focusing axial cam followers 8a have been brought into contact with the infinite distance side surfaces 28, when further turning the outer intermediate barrel 4 in the CW direction, the ZF cam barrel 7 is dragged in the wide-angle direction to force the click ball 17 to get out of the detent recess 26, allowing the zoom lens to change the zoom ratio toward the largest setting.

In this instance, there are three ways to situate the outer intermediate barrel 4 ready for succeeding focusing after a conclusion of preceding zooming, namely first to third operating way. In the first operating way, the outer intermediate barrel 4 is situated and remains in the infinite subject distance (∞) position in which the zoom lens having been focused on a subject at an infinity distance (FIG. 5A) always after a conclusion of preceding zooming. In the second operating way, the outer intermediate barrel 4 is situated and remain in the closest subject distance (CSD) position in which the zoom lens has been focused on a subject at the possible closest subject distance (FIG. 5B) always after a conclusion of preceding zooming. In the third operating way, the outer intermediate barrel 4 is situated and remain in a position at a conclusion of preceding zooming always after a conclusion of preceding zooming.

Operation of the outer intermediate barrel 4 in the respective operating ways will be hereafter described with reference to FIGS. 6A through 8B.

Figure 6A:
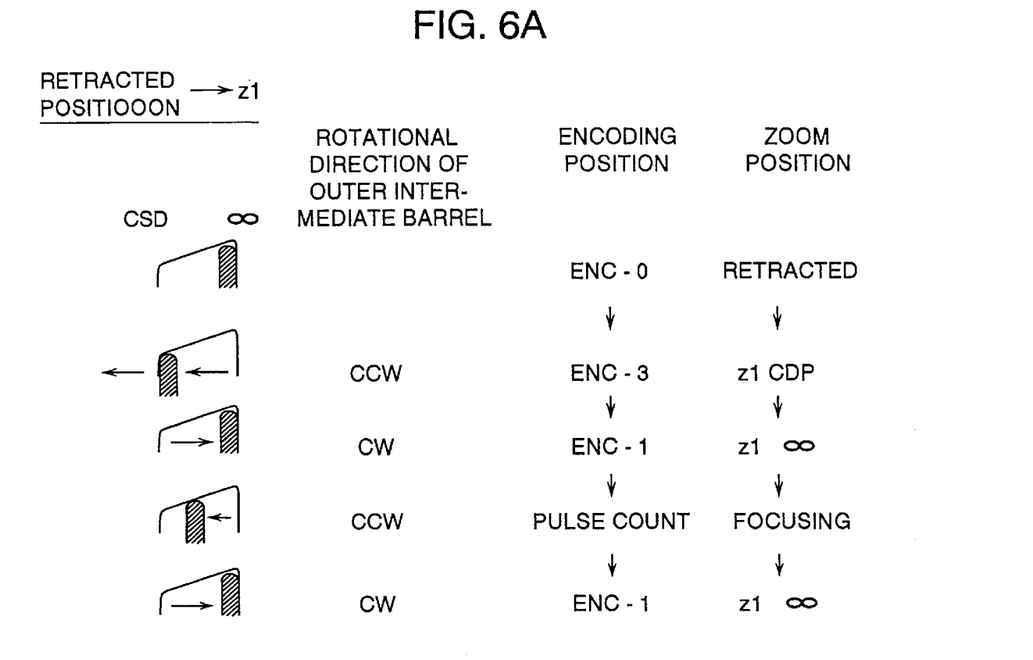
FIGS. 6A–6C, 7A–7C, 8A and 8B are an explanatory views showing operation of the outer intermediate barrel and the positional relationship between the focusing cam and focusing cam follower at various zooming positions of the zoom lens barrel assembly.
Figure 6B:
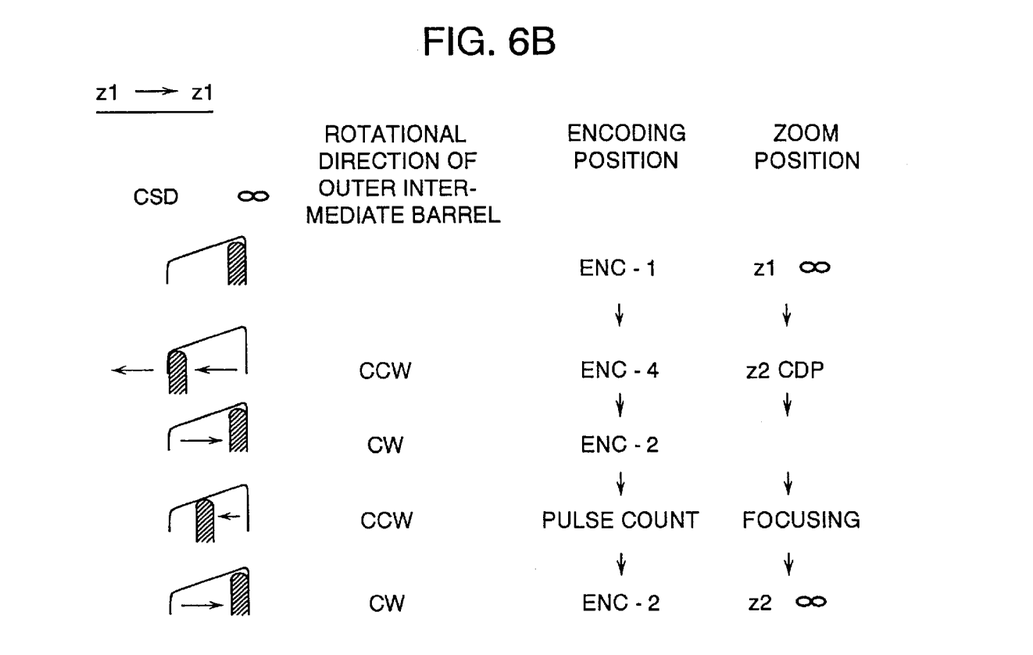
Figure 6C:
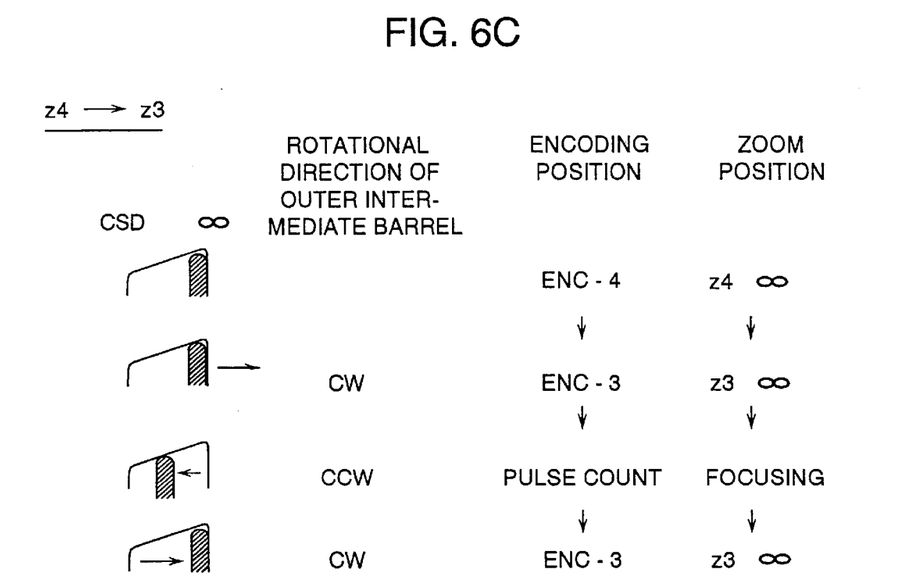

FIGS. 6A through 6C show sequential operation of the outer intermediate barrel 4 in the first way for some exemplified cases.

(1) Operation from the Retracted Position (RTP) to the Zooming Position z1:

FIG. 6A shows operation of the outer intermediate barrel to put the zoom lens ready for focusing when a shift of the zoom lens is made from the retracted position to the zooming position z1. Retraction of the zoom lens barrel assembly 1 into the retracted position is achieved by turning the outer intermediate barrel 4 in the CW or wide-angle direction. In consequence, in this retracted position, the focusing axial cam followers 8a of the focusing barrel 8 remain engaged by the infinite distance side surfaces 28 of the focusing cam surfaces of the ZF cam barrel 7, and the encoder brush 23 is situated so as to put its contact points 23a on the encoding teeth of the center and side segments 22A, 22B and 22C in the encoding position ENC-0. As was previously described, when turning the outer intermediate barrel 4 from the retracted position in the CCW direction, the focusing barrel 8 is forced by the outer intermediate barrel 4 to turn in the CCW direction through an angle covering the play zone having an angular interval two times as long as the regular click stop interval between the adjacent detent recesses 26, and then the focusing axial cam followers 8a are brought into engagement with the closest distance side surfaces 29. Thereafter, the ZF cam barrel 7 will be dragged by the focusing barrel 8 in the telephoto direction during the turn of the outer intermediate barrel 4. Specifically, in this instance, because the encoding interval and the click stop interval are equal to each other, until a relative turn between the ZF and focusing barrels 7 and 8 through the play interval is achieved while the ZF cam barrel 7 remains stopped, the encoder brush 23 is shifted by a distance two times as long as an encoding interval (a regular interval between each adjacent encoding positions ENC-x of the encoder pattern 22) or a click stop interval. Accordingly, if the outer intermediate barrel 4 is turned in the CCW direction for zooming and interrupted in rotation when the encoder brush 23, in particular the contacts points 23a, reaches the encoding position ENC-3, the ZF cam barrel 7 is dragged by the focusing barrel 8 until reaching the zooming position z1 and is retained in that zooming position by means of engagement of the detent recess 26 with the click ball 17. In this state, the focusing barrel 8 is situated in the closest distance subject (CSD) position by the engagement of the focusing axial cam followers 8a with the infinite distance side surfaces 28. Thus, the zoom lens in the zooming position z1 is ready for focusing from the infinity subject distance position ($\infty$) position.

The outer intermediate barrel 4 is turned in the CCW direction for focusing the zoom lens on an intended subject. During the turn of the outer intermediate barrel 4 in the CCW direction, pulses generated according to a turned angle of the outer intermediate barrel 4 are counted until focusing is achieved. After exposure, the outer intermediate barrel 4 is turned back in the CW direction through an angular interval corresponding to the number of pulses having been counted during focusing, returning the focusing barrel 8 to the infinity subject distance ($\infty$) position in which the focusing axial cam followers 8a are brought into engagement with the infinite distance side surfaces 28. In this state, the encoder brush 32 is returned to place the contact points 32a in the encoding position ENC-1. Thus, the zoom lens is ready for another zooming and/or focusing from the infinity subject distance ($\infty$) position.

(2) Operation from the Zooming Position z1 to the Zooming Position z2:

FIG. 6B shows operation of the outer intermediate barrel to put the zoom lens ready for focusing when a shift of the zoom lens is made from the zooming position z1 to the zooming position z1. At first, the outer intermediate barrel 4 is turned in the CCW direction through an angular interval corresponding to the play interval (which is two times as long as the encoding interval or the click stop interval) from the infinite subject distance ($\infty$) position with the result of bringing the focusing axial cam followers 8a into engagement with the closest distance side surfaces 29, which is accompanied by a shift of the encoder brush 32 to the encoding position ENC-3. When the outer intermediate barrel 4 is further turned in the CCW direction through an angular interval corresponding to the click stop interval for zooming, the ZF cam barrel 7 is dragged by the focusing barrel 8 through the engagement of the focusing axial cam followers 8a with the closest distance side surfaces 29, and situated in the zooming position z2. In this state, the detent recess 26 is engaged by the click ball 17 to retain the ZF cam barrel 7 in that zooming position z2, and the encoder brush 32 is shifted to the encoding position ENC-4. Subsequently, the outer intermediate barrel 4 is turned back in the CW direction through an angular interval two times as long as the click stop interval to shift the focusing barrel 8, bringing the focusing axial cam followers 8a into engagement with the infinite distance side surfaces 28 which is accompanied by a shift of the encoder brush 32 to the encoding position ENC-2. Thus, the zoom lens in the zooming position z2 is ready for focusing from the infinity subject distance ($\infty$) position.

The outer intermediate barrel 4 is turned in the CCW direction for focusing the zoom lens on an intended subject. During the turn of the outer intermediate barrel 4 in the CCW direction, pulses generated according to a turned angle of the outer intermediate barrel 4 are counted until focusing is achieved. After exposure, the outer intermediate barrel 4 is turned back in the CW direction through an angular interval corresponding to the number of pulses having been counted during focusing, returning the focusing barrel 8 to the infinity subject distance ($\infty$) position, in which the focusing axial cam followers 8a are brought into engagement with the infinite distance side surfaces 28. In this state, the encoder brush 32 is returned to the encoding position ENC-2. Thus, the zoom lens in the zooming position z2 is ready for another zooming and/or focusing from the infinity subject distance ($\infty$) position.

(3) Operation from the Zooming Position z4 to the Zooming Position z3:

FIG. 6C shows operation of the outer intermediate barrel to put the zoom lens ready for focusing when a shift of the zoom lens is made from the zooming position z4 to the zooming position z3.

When performing a shift of the zoom lens from the zooming position z4 where the focusing barrel 8 is situated with the focusing axial cam followers 8a in engagement with the infinite distance side surfaces 28 and the encoder blush 23 is in the encoding position ENC-4 to the zooming position z3 by turning the outer intermediate barrel 4 in the CW direction through an angular interval corresponding to the click stop interval to turn the ZF cam barrel 7 together with the focusing barrel 8, the detent recess 26 corresponding to the zooming position z3 is brought into engagement with the click ball 17 as well as a shift back of the encoder brush 23 to the encoding position ENC-3. In this state, since the focusing axial cam followers 8a remain engaged by the infinite distance side surfaces 28, the zoom lens in the zooming position z3 is ready for focusing from the from the infinite subject distance.

For focusing the zoom lens on an intended subject, the outer intermediate barrel 4 is turned in the CCW direction. During the turn of the outer intermediate barrel 4 in the CCW direction, pulses generated according to a turned angle of the outer intermediate barrel 4 are counted until focusing is achieved. After exposure, the outer intermediate barrel 4 is turned back in the CW direction through an angular interval corresponding to the number of pulses having been counted during focusing, returning the focusing barrel 8 to the infinity subject distance ($\infty$) position, in which the focusing axial cam follower 8a is brought into engagement with the infinite distance side surface 28. In this state, the encoder brush 32 is returned to the encoding position ENC-3. Thus, the zoom lens in the zooming position z3 is ready for another zooming and/or focusing from the infinity subject distance ($\infty$) position.

Figure 7A:
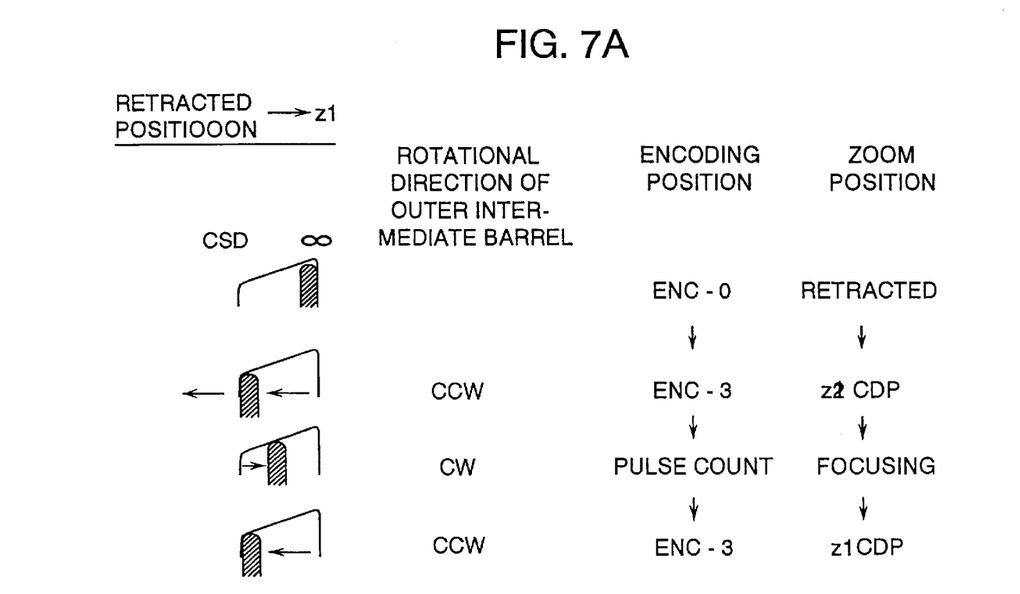
Figure 7B:
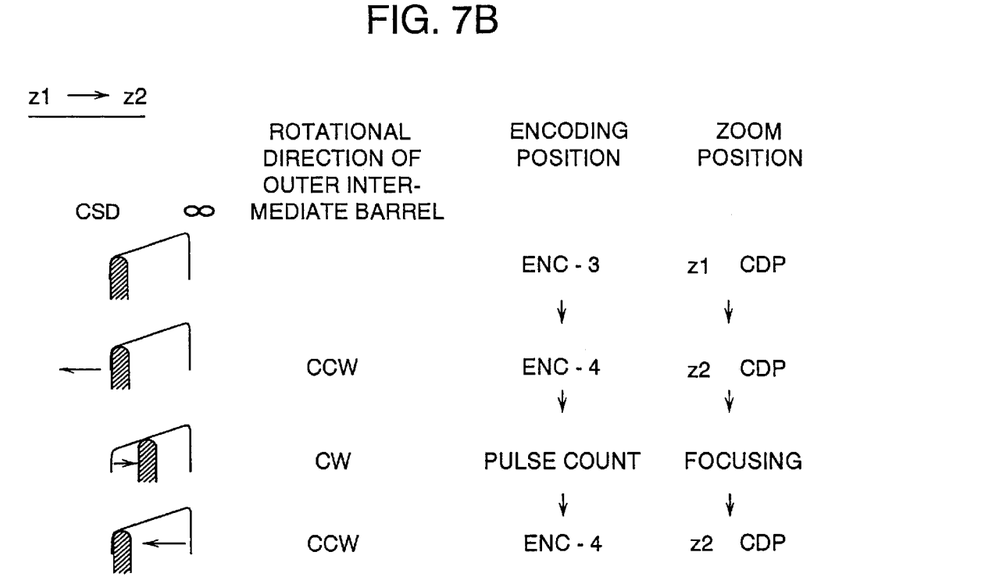
Figure 7C:
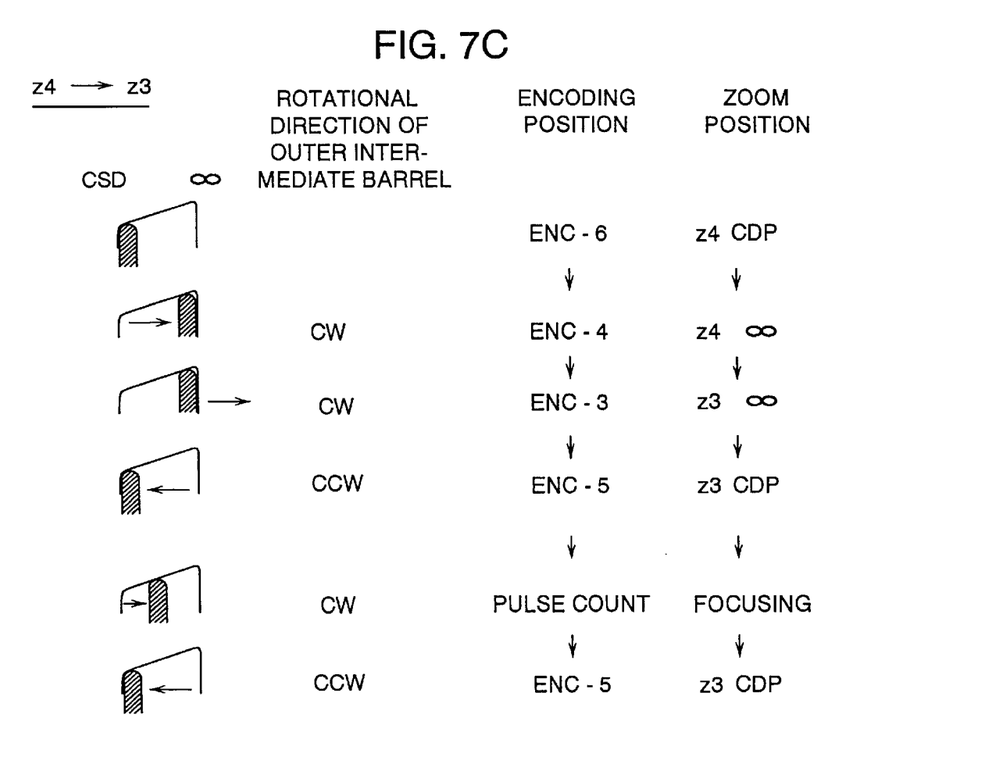

FIGS. 7A through 7C show sequential operation of the outer intermediate barrel 4 in the second way for some exemplified cases.

(1) Operation from the Retracted Position to the Zooming Position z1 (FIG. 7A):

FIG. 7A shows operation of the outer intermediate barrel to put the zoom lens ready for focusing when a shift of the zoom lens is made from the retracted position (RTP) to the zooming position z1.

When the focusing barrel 8 is situated with the focusing axial cam followers 8a of the focusing barrel 8 engaged by the infinite distance side surfaces 28 of the focusing cam surfaces of the ZF cam barrel 7 in the retracted position corresponding to the encoding position ENC-0, at first, the outer intermediate barrel 4 is turned in the CCW direction through an angular interval two times as long as the click stop interval so as to turn the focusing barrel 8 to bring the focusing axial cam followers 8a into engagement with the closest distance side surfaces 29 as well as shifting the encoder brush 32 to the encoding position ENC-1. The outer intermediate barrel 4 is continuously turned in the CCW direction to drag the ZF cam barrel 7 by the focusing barrel 8 until the ZF cam barrel 7 is stopped by means of engagement between the detent recess 26 corresponding to the zooming position z1 and the click ball 17. In the zooming position z1, the focusing axial cam followers 8a remain engaged by the closest distance side surfaces 29 and the encoder brush 32 is situated in the encoding position ENC-3. Thus, the zoom lens in the zooming position z1 is ready for focusing from the closest subject distance (CSD) position.

The outer intermediate barrel 4 is turned in the CW direction for focusing the zoom lens on an intended subject. During the turn of the outer intermediate barrel 4 in the CW direction, pulses generated according to a turned angle of the outer intermediate barrel 4 are counted until focusing is achieved. After exposure, the outer intermediate barrel 4 is turned bach in the CCW direction through an angular interval corresponding to the number of pulses having been counted during focusing, returning the focusing barrel 8 to the closest subject distance (CSD) position in which the focusing axial cam followers 8a are brought into engagement with the closest distance side surfaces 29. In this state, the encoder brush 32 is returned to the encoding position ENC-3. Thus, the zoom lens is ready for another zooming and/or focusing from the closest subject distance (CSD) position.

(2) Operation from the Zooming Position z1 to the Zooming Position z2 (FIG. 7B):

FIG. 7B shows operation of the outer intermediate barrel to put the zoom lens ready for focusing when a shift of the zoom lens is made from the zooming position z1 to the zooming position z1.

When turning the outer intermediate barrel 4 in the CCW direction through an angular interval corresponding to the click stop interval from the closest subject distance (CSD) position until the ZF cam barrel 7 is stopped by means of engagement between the detent recess 26 corresponding to the zooming position z2 and the click ball 17 with the result of shifting the encoder brush 32 to the encoder position ENC-4 from the encoding position ENC-3. In this zooming position z2, the encoder brush 32 is returned to the encoding position ENC-4. Thus, the zoom lens is ready for another zooming and/or focusing from the closest subject distance (CSD) position. The outer intermediate barrel 4 is turned in the CW direction for focusing the zoom lens on an intended subject. During the turn of the outer intermediate barrel 4 in the CW direction, pulses generated according to a turned angle of the outer intermediate barrel 4 are counted until focusing is achieved. After exposure, the outer intermediate barrel 4 is turned back in the CCW direction through an angular interval corresponding to the number of pulses having been counted during focusing, returning the focusing barrel 8 to the closest subject distance (CSD) position, in which the focusing axial cam followers 8a are brought into engagement with the closest distance side surfaces 28. In this state, the encoder brush 32 is returned to the encoding position ENC-4. Thus, the zoom lens in the zooming position z2 is ready for another zooming and/or focusing from the closest subject distance (CSD) position.

(3) Operation from the Zooming Position z4 to the Zooming Position z3:

FIG. 7C shows operation of the outer intermediate barrel to put the zoom lens ready for focusing when a shift of the zoom lens is made from the zooming position z4 to the zooming position z3.

When performing a shift the zoom lens from the zooming position z4 where the focusing barrel 8 is situated with the focusing axial cam followers 8a in engagement with the closest distance side surfaces 28 and the encoder blush 23 is in the encoding position ENC-6 to the zooming position z3, after a turn of the outer intermediate barrel 4 in the CW direction through an angular interval two times as long as the click stop interval with the result of shifting the encoder brush 32 to the encoding position ENC-4 and bringing the focusing axial cam followers 8a into engagement with the infinite distance side surfaces 28, the outer intermediate barrel 4 is further turned in the CCW direction through an angular interval corresponding to the click stop interval until the ZF cam barrel 7 is stopped by means of engagement between the detent recess 26 corresponding to the zooming position z3 and the click ball 17 and the encoder brush 32 is shifted to the encoder position ENC-3 from the encoding position ENC-4. In this state, the focusing axial cam followers 8a remain engaged by the infinite distance side surfaces 28. Then, the outer intermediate barrel 4 is turned back in the CCW direction through an angular interval two times as long as the click as stop interval with the result of bringing the focusing axial cam followers 8a into engagement with the closest distance side surfaces 29 and shifting the encoder brush 32 to the encoding position ENC-5. In this state, the zoom lens in the zooming position z3 is ready for focusing from the closest subject distance (CSD) position.

For focusing the zoom lens on an intended subject, the outer intermediate barrel 4 is turned in the CW direction. During the turn of the outer intermediate barrel 4 in the CW direction, pulses generated according to a turned angle of the outer intermediate barrel 4 are counted until focusing is achieved. After exposure, the outer intermediate barrel 4 is turned back in the CCW direction through an angular interval corresponding to the number of pulses having been counted during focusing, returning the focusing barrel 8 to the closest subject distance (CSD) position, in which the focusing axial cam follower 8a is brought into engagement with the closest distance side surface 29. In this state, the encoder brush 32 is returned to the encoding position ENC-5. Thus, the zoom lens in the zooming position z3 is ready for another zooming and/or focusing from the closest subject distance (CSD) position.

Figure 8A:
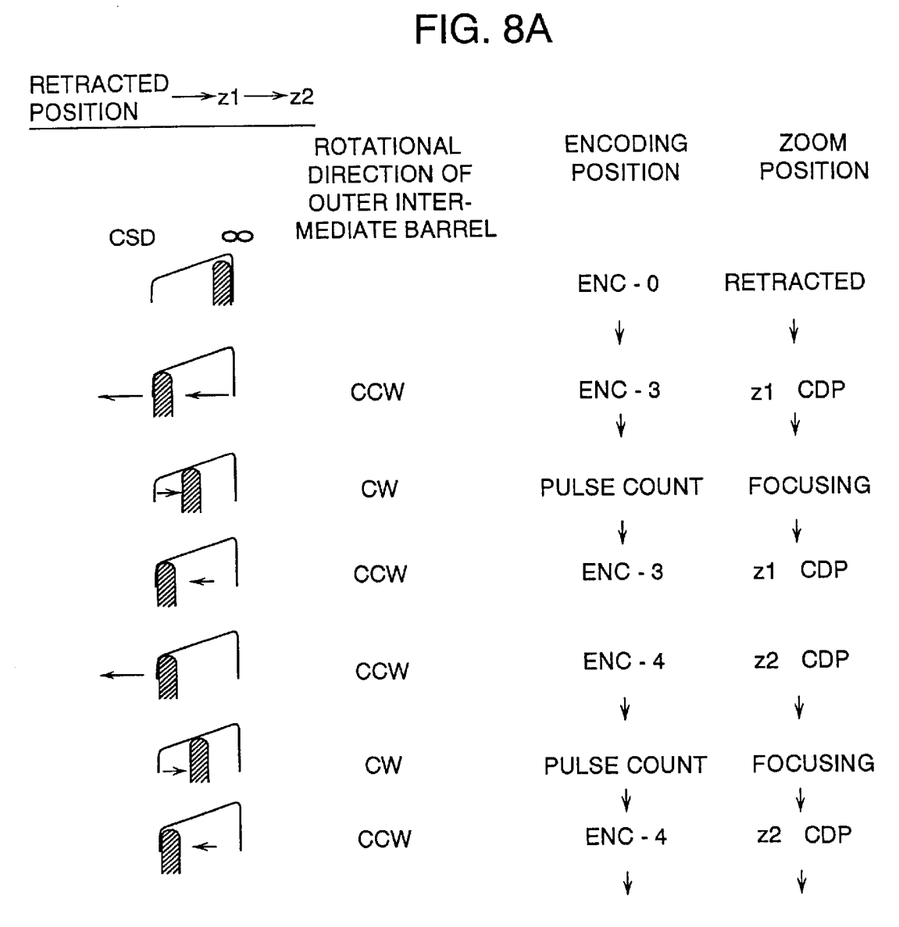
Figure 8B:
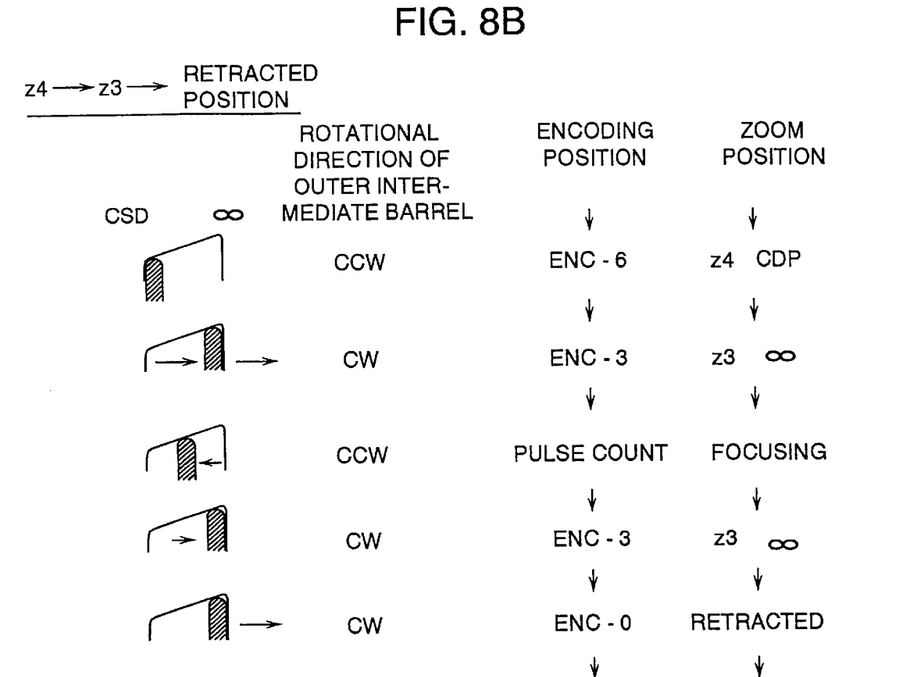

FIGS. 8A and 8B show sequential operation of the outer intermediate barrel 4 in the third way for some exemplified cases. In this way, the outer intermediate barrel 4 is reversed in operational direction between preceding zooming and subsequent focusing.

(1) Operation from the Retracted Position to the Zooming Position z1, and then to the Zooming Position z2:

FIG. 8A shows operation of the outer intermediate barrel to put the zoom lens ready for focusing when a shift of the zoom lens is made from the retracted position (RTP) to the zooming position z1, and then to the zooming position z2.

When turning the outer intermediate barrel 4 in the CCW direction from the retracted position in which the focusing axial cam followers 8a are in engagement with the infinite distance side surfaces 28 and the encoder brush 32 is situated in the encoder position ENC-0 until the ZF cam barrel 7 is shifted to the zooming position z1, at first, the outer intermediate barrel 4 is turned in the CCW direction through an angular interval two times as long as the click stop interval and subsequently through an angle interval corresponding to the encoding interval to drag the ZF cam barrel 7 by the focusing barrel 8 until it is stopped by means of engagement between the detent recess 26 corresponding to the zooming position z1 and the click ball 17 and the encoder brush 32 is shifted to the encoder position ENC-3 via the encoding position ENC-2. In this zooming position z1, the focusing axial cam followers 8a is in engagement with the closest distance side surfaces 29. In this state, the zoom lens in the zooming position z1 is ready for focusing from the closest subject distance (CSD) position.

The outer intermediate barrel 4 can be turned in the CW direction to focus the zoom lens on an intended subject. During the turn of the outer intermediate barrel 4 in the CW direction, pulses generated according to a turned angle of the outer intermediate barrel 4 are counted until focusing is achieved. After exposure, the outer intermediate barrel 4 is turned back in the CCW direction through an angular interval corresponding to the number of pulses having been counted during focusing, returning the focusing barrel 8 to the closest subject distance (CSD) position. In this state, the encoder brush 32 is returned to the encoding position ENC-3. Thus, the zoom lens in the zooming position z1 is ready for another zooming from the closest subject distance (CSD) position.

For achieving a change in zooming position of the zoom lens from the zooming position z1 to the zooming position z2, the outer intermediate barrel 4 is turned in the CCW direction through an angular interval corresponding to the click stop interval. During the turn of the outer intermediate barrel 4 in the CCW direction, the ZF cam barrel 7 is dragged by the focusing barrel 8 until it is stopped by means of engagement between the detent recess 26 corresponding to the zooming position z2 and the click ball 17 and the encoder brush 32 is shifted to the encoder position ENC-4. In this zooming position z2, the focusing axial cam followers 8a remain in engagement with the closest distance side surfaces 29. In this state, the zoom lens in the zooming position z2 is ready for focusing from the closest subject distance (CSD) position.

In the same manner, the zoom lens is focused on an intended subject by turning the outer intermediate barrel in the CW direction. During the turn of the outer intermediate barrel 4 in the CW direction, pulses generated according to a turned angle of the outer intermediate barrel 4 are counted until focusing is achieved. After exposure, the outer intermediate barrel 4 is turned back in the CCW direction through an angular interval corresponding to the number of pulses having been counted during focusing, returning the focusing barrel 8 to the closest subject distance (CSD) position. In this state, the encoder brush 32 is returned to the encoding position ENC-4. Thus, the zoom lens in the zooming position z2 is ready for another zooming from the closest subject distance (CSD) position.

(2) Operation from the Zooming Position z4 to the Zooming Position z3, and then to the Retracted Position (FIG. 8B):

FIG. 8A shows operation of the outer intermediate barrel to put the zoom lens ready for focusing when a shift of the zoom lens is made from the zooming position z4 to the zooming position z3, and thereafter to the retracted position (RTP).

In the zooming position z4, the focusing axial cam followers 8a are in engagement with the closest distance side surfaces 29 and the encoder brush 32 is situated in the encoding position ENC-6. For shifting the zoom lens to the zooming position z3 from the zooming position z4, the outer intermediate barrel 4 is turned in the CW direction through an angular interval two times as long as the click stop interval and subsequently through an angular interval corresponding to the click stop interval to drag the ZF cam barrel 7 by the focusing barrel 8 until it is stopped by means of engagement between the detent recess 26 corresponding to the zooming position z3 and the click ball 17 and the encoder brush 32 is shifted to the encoder position ENC-3 via the encoding position ENC-4. In this zooming position z3, the focusing axial cam followers 8a are in engagement with the closest distance side surfaces 29. In this state, the zoom lens in the zooming position z3 is ready for focusing from the closest subject distance (CSD) position.

The outer intermediate barrel 4 is turned in the CCW direction to focus the zoom lens on an intended subject. During the turn of the outer intermediate barrel 4 in the CW direction, pulses generated according to a turned angle of the outer intermediate barrel 4 are counted until focusing is achieved. After exposure, the outer intermediate barrel 4 is turned back in the CW direction through an angular interval corresponding to the number of pulses having been counted during focusing, returning the focusing barrel 8 to the closest subject distance (CSD) position. In this state, the encoder brush 32 is returned to the encoding position ENC-3. Thereafter, the outer intermediate barrel 4 is turned in the CW direction to shift the encoder brush 32 to the encoder position ENC-0. During this turn of the outer intermediate barrel 4 in the CW direction, the focusing barrel 8 and the ZF cam barrel 7 dragged by the focusing barrel 8 are turned in the CW direction to retract the zoom lens into the retracted position.

As apparent from the above description, in the zoom lens barrel assembly 1, the ZF cam barrel 7 has a plurality of detent recesses 26 for positioning the zoom lens in predetermined zooming positions which are arranged at regular angular intervals agreeing with regular encoding intervals of the encoder pattern 22A for controlling a turn of the outer intermediate barrel 4, and the ZF and focusing barrels 7 and 8 are movable relatively each other through an angular interval corresponding to an integral multiple of, for instance two times in this embodiment as long as, the regular click stop interval, and hence the regular encoding interval, rotation of the outer intermediate barrel is easily controlled.

It is to be understood that the present invention may be embodied with various changes, modifications and improvements, which may occur to those skilled in the art, without departing from the spirit and scope of the invention defined in the following claims.

What is claimed is:

1. A zoom lens barrel assembly having a plurality of barrels rotatable about an optical axis of a zoom lens to shift a plurality of lenses along the optical axis so as thereby to achieve zooming and focusing the zoom lens, said zoom lens barrel assembly comprising:

a motor driven operating barrel operative to achieve zooming and focusing of said zoom lens;

a first barrel which rotates to shift at least one of said lenses along said optical axis for zooming said zoom lens;

positioning means for situating and stopping said first barrel in a plurality of zooming positions arranged at regular angular intervals; and a second barrel which rotates together with said motor driven operating barrel, said second barrel being operationally coupled to said first barrel together to rotate as one whole during zooming said zoom lens and shiftable relatively to said first barrel through an angular interval to shift at least another one of said lenses relatively to said one of said lenses along said axis for focusing said zoom lens while said positioning means stops said first barrel in any one of said zooming positions.

2. The zoom lens barrel as defined in claim 1, wherein said motor driven operating barrel is reversed in rotary direction between focusing and zooming.

3. The zoom lens barrel as defined in claim 1, and further comprising an encoder having a plurality of encoding positions arranged at regular encoding intervals correspondingly to said zooming positions for controlling said motor driven operating barrel to situate said first barrel in any one of said zooming positions so as thereby to achieve zooming said zoom lens.

4. The zoom lens barrel as defined in claim 3, wherein said positioning means comprises detent recesses arranged at regular angular intervals corresponding to said regular encoding intervals on said first barrel and a click ball stationary installed in the zoom lens barrel assembly operative to engage with said detent recesses.

5. A zoom lens barrel assembly having a plurality of barrels rotatable about an optical axis of a zoom lens to shift a plurality of lenses along the optical axis so as thereby to achieve zooming and focusing the zoom lens, said zoom lens barrel assembly comprising:

a motor driven operating barrel operative to achieve zooming and focusing of said zoom lens;

a first barrel which rotates to shift at least one of said lenses along said optical axis for zooming said zoom lens;

positioning means for situating and stopping said first barrel in a plurality of predetermined positions arranged at regular angular intervals; and a second barrel which rotates together with said motor driven operating barrel, said second barrel being operationally coupled to said first barrel together to rotate as one whole during zooming said zoom lens and shiftable relatively to said first barrel through an angular interval corresponding to an integral multiple as long as said regular angular interval to shift at least another one of said lenses relatively to said one of said lenses along said axis for focusing said zoom lens while said positioning means stops said first barrel in any one of said zooming positions.

6. The zoom lens barrel as defined in claim 5, wherein said motor driven operating barrel is reversed in rotary direction between focusing and zooming.

7. The zoom lens barrel as defined in claim 5, and further comprising an encoder having a plurality of encoding positions arranged at regular encoding intervals correspondingly to said zooming positions for controlling said motor driven operating barrel to situate said first barrel in any one of said zooming positions so as thereby to achieve zooming said zoom lens.

8. The zoom lens barrel as defined in claim 7, wherein said positioning means comprises detent recesses arranged at regular angular intervals corresponding to said regular encoding intervals on said first barrel and a click ball stationary installed in the zoom lens barrel assembly operative to engage with said detent recesses.

9. A zoom lens barrel assembly having a plurality of barrels rotatable about an optical axis of a zoom lens to shift a plurality of lenses along the optical axis so as thereby to achieve zooming and focusing the zoom lens, said zoom lens barrel assembly comprising:

a motor driven operating barrel operative to achieve zooming and focusing of said zoom lens;

a first barrel having a zooming cam and a focusing cam which rotates to shift at least one of said lenses along said optical axis through said zooming cam for zooming said zoom lens;

positioning means for situating said first barrel in a plurality of zooming positions arranged at regular angular intervals; and a second barrel which rotates together with said motor driven operating barrel, said second barrel being operationally coupled to said first barrel together to rotate as one whole during zooming said zoom lens and shiftable relatively to said first barrel through an angular interval corresponding to an integral multiple as long as said regular angular interval to shift at least another one of said lenses relatively to said one of said lenses along said axis through said focusing cam for focusing said zoom lens while said positioning means stops said first barrel in any one of said zooming positions.

10. The zoom lens barrel as defined in claim 9, wherein said motor driven operating barrel is reversed in rotary direction between focusing and zooming.

11. The zoom lens barrel as defined in claim 9, and further comprising an encoder having a plurality of encoding positions arranged at regular encoding intervals correspondingly to said zooming positions for controlling said motor driven operating barrel to situate said first barrel in any one of said zooming positions so as thereby to achieve zooming said zooming lens.

12. The zoom lens barrel as defined in claim 11, wherein said positioning means comprises detent recesses arranged at regular angular intervals corresponding to said regular encoding intervals on said first barrel and a click ball stationary installed in the zoom lens barrel assembly operative to engage with said detent recesses.

* * * * *